(No Model.)
S. E. & S. A. BROWNE.
THILL COUPLING.
No. 288,541. Patented Nov. 13, 1883.
Fig. 1.
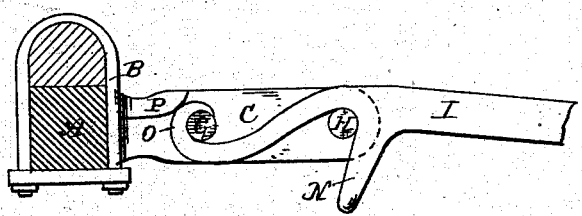
Fig. 2.
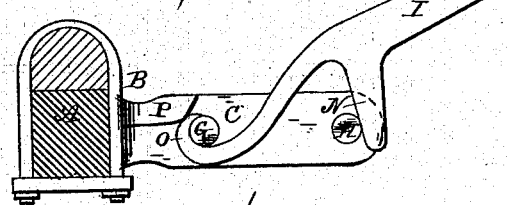
Fig. 3.
Fig. 4.
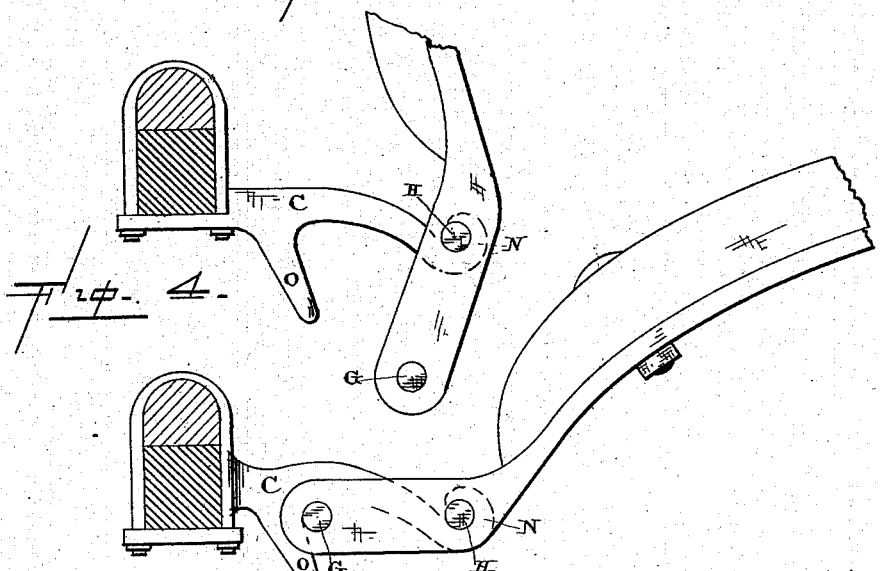
Witnesses —
Louis F. Gardner
J. W. Garner
Inventors —
Symmes E. Browne,
Saml. A. Browne,
per P. A. Lehmann
Atty

UNITED STATES PATENT OFFICE.

SYMMES E. BROWNE, OF COLUMBUS, AND SAMUEL A. BROWNE, OF CINCINNATI, OHIO; SAID SAMUEL A. BROWNE, ASSIGNOR TO SAID SYMMES E. BROWNE.

THILL-COUPLING.

SPECIFICATION forming part of Letters Patent No. 288,541, dated November 13, 1883.

Application filed April 4, 1883. (No model.)

*To all whom it may concern:*

Be it known that we, SYMMES E. BROWNE, of Columbus, in the county of Franklin and State of Ohio, and SAMUEL A. BROWNE, of Cincinnati, in the county of Hamilton and State of Ohio, have invented certain new and useful Improvements in Thill-Couplings; and we do hereby declare the following to be a full, clear, and exact description of the invention, such as will enable others skilled in the art to which it pertains to make and use it, reference being had to the accompanying drawings, which form part of this specification.

Our invention relates to an improvement in thill-couplings; and it consists in the combination of a shackle with two rivets or bolts reaching through its sides, with a coupling-iron formed into two hooks set in reverse positions, so that one will hook upward around one rivet or bolt in the shackle, while the other hook will hook downward over the other rivet or bolt in the shackle, as will be more fully described hereinafter.

The object of our invention is to provide a safe and convenient coupling, which can be attached and detached quickly without the use of tools, and at the same time wedge the anti-rattling device into its place with sufficient pressure to prevent all noise.

Figures 1 and 2 represent side elevations of our invention, showing the parts in different positions. Figs. 3 and 4 are side elevations of a slight modification of the same, showing the parts in different positions.

A represents the axle, and B the clip. Secured either directly to the clip-bar or directly to the front side of the clip itself, as shown in Figs. 1 and 2, is the shackle C, which is made to extend any suitable distance forward, and which has two rivets or bolts, G H, extending horizontally from side to side.

The coupling-iron I may either form a part of the shaft-iron, as shown in Figs. 1 and 2, or it may be attached to the clip-bar or to the front side of the clip, as shown in Figs. 3 and 4. When this coupling-iron is attached, as shown in Figs. 3 and 4, the coupling will form a part of the shaft-iron. These two parts may be used either as shown in Figs. 1 and 2 or as shown in Figs. 3 and 4, as may be preferred. This coupling-iron has its end formed into two hooks, N O, which are set in reverse positions to each other, as shown. The shorter hook O, when the coupling-iron forms a part of the shaft-iron, is made to catch around under the inner rivet, G, while the larger and outer hook, N, is made to catch over the rivet H. The end of the hook O is made tapering, as shown, so as to wedge the anti-rattling device P firmly and securely in position, and thus prevent all noise. The hook N is set on a curve which is drawn from the center of the rivet G, so that the rear side of the hook will bear against the rivet H at every point.

When the coupling-iron is attached to the clip, as shown in Figs. 3 and 4, and the shackle forms a part of the tongue-iron, the parts will be simply reversed, while their operation is the same, and the anti-rattling device will then be applied directly to the shaft-iron, instead of as in Figs. 1 and 2. As in the other case, the tapering end of the smaller hook will wedge tightly against this device, and thus prevent all rattling. In removing the shaft from the shackle, it is only necessary to raise up the outer end of the shaft, which will cause the inner end of the hook or the shackle to become disengaged, and then the shaft has only to be lifted upward and outward.

Having thus described our invention, we claim—

1. The combination of a shackle provided with two rivets or bolts with a coupling-iron provided with two hooks which are set in reverse positions, substantially as described.

2. The combination of the shackle provided with two rivets or bolts, G H, with the coupling-iron formed into two hooks which are set in reverse position, the larger hook of the two being formed on a circle which is run from the center of the rivet G, substantially as set forth.

3. The combination of the shackle provided with the two rivets or bolts G H, the coupling-iron formed into the two hooks which are set in reverse position, and the anti-rattling device, which is wedged into position by one of the hooks, substantially as specified.

In testimony whereof we affix our signatures in presence of two witnesses.

SYMMES E. BROWNE.
SAMUEL A. BROWNE.

Witnesses:
HORACE WILSON,
JOHN J. STODDARD.